(12) United States Patent
Rumpfhuber et al.

(10) Patent No.: US 11,992,747 B2
(45) Date of Patent: May 28, 2024

(54) MOLD SET FOR A SKI PRESS

(71) Applicant: TYPS GMBH, Salzburg (AT)

(72) Inventors: Siegfried Rumpfhuber, Mondsee (AT); Christian Eder, Buchkirchen (AT)

(73) Assignee: O+ GmbH, Bergheim (AT)

( * ) Notice: Subject to any disclaimer, the term of this patent is extended or adjusted under 35 U.S.C. 154(b) by 0 days.

(21) Appl. No.: 17/603,723

(22) PCT Filed: Apr. 15, 2020

(86) PCT No.: PCT/EP2020/060631
§ 371 (c)(1),
(2) Date: Oct. 14, 2021

(87) PCT Pub. No.: WO2020/212451
PCT Pub. Date: Oct. 22, 2020

(65) Prior Publication Data
US 2022/0193529 A1   Jun. 23, 2022

(30) Foreign Application Priority Data
Apr. 15, 2019   (AT) ............... A 60098/2019

(51) Int. Cl.
*A63C 5/12* (2006.01)
*B29C 43/20* (2006.01)
*B29C 43/52* (2006.01)
*B29C 43/36* (2006.01)

(52) U.S. Cl.
CPC ............ *A63C 5/12* (2013.01); *B29C 43/203* (2013.01); *B29C 43/52* (2013.01); *B29C 2043/3652* (2013.01)

(58) Field of Classification Search
None
See application file for complete search history.

(56) References Cited

U.S. PATENT DOCUMENTS

| | | | |
|---|---|---|---|
| 3,993,527 A | 11/1976 | Ohta | |
| 4,688,778 A | 8/1987 | Woltron | |
| 4,713,032 A | 12/1987 | Frank | |
| 4,747,898 A | 5/1988 | Woltron | |
| 4,806,302 A | 2/1989 | Frank | |
| 5,047,198 A | 9/1991 | Kim | |
| 8,261,803 B2 | 9/2012 | Espe | |

(Continued)

FOREIGN PATENT DOCUMENTS

| | | |
|---|---|---|
| AT | 363830 B | 9/1981 |
| AT | 11913 U1 | 7/2011 |

(Continued)

OTHER PUBLICATIONS

Machine Translation of Langzauner AT11913U1 (Year: 2011).*

(Continued)

*Primary Examiner* — Robert J Grun
(74) *Attorney, Agent, or Firm* — Millen, White, Zelano & Branigan, P.C.; Brion P. Heaney

(57) ABSTRACT

Mold set for insertion in a ski press (2) comprising a substructure which has a base plate (4), a lower contour (5) and a lower heating element (7), and an upper structure having a cover plate (16), an upper contour (15), and an upper heating element, so that a ski mold can be inserted between the substructure and the upper structure.

18 Claims, 1 Drawing Sheet

(56) References Cited

U.S. PATENT DOCUMENTS 10,434,688 B2 10/2019 Takano et al.
2014/0217641 A1 8/2014 Christoud et al.

FOREIGN PATENT DOCUMENTS

| | | | | |
|---|---|---|---|---|
| CH | 307722 | A | 6/1955 | |
| CN | 101733949 | A | 6/2010 | |
| CN | 204123711 | U | 1/2015 | |
| DE | 2829632 | A1 | 8/1979 | |
| DE | 2902613 | A1 | 8/1979 | |
| FR | 2710288 | A1 * | 3/1995 | ........... B29C 33/303 |
| JP | S5125383 | B1 | 7/1976 | |
| JP | S59501832 | A | 11/1984 | |
| JP | S60501991 | A | 11/1985 | |
| JP | S61141549 | A | 6/1986 | |
| JP | H01283117 | A | 11/1989 | |
| WO | 2013187399 | A1 | 12/2013 | |

OTHER PUBLICATIONS

Machine Translation of Renaudet (FR 2710288) (Year: 1995).*
International Search Report dated Aug. 11, 2020 issued in corresponding PCT/EP2020/060631 application (2 pages).
Office Action in corresponding CN application 202080028831.3 dated Jan. 26, 2024 (pp. 1-9).
Office Action in corresponding JP Application No. 2021-561049 dated Mar. 11, 2024 ( pp. 1-6 ) and English translation thereof (pp. 1-6).

* cited by examiner

MOLD SET FOR A SKI PRESS

FIELD OF INVENTION

The new manufacturing concept for skis enables serial, industrial production with a batch size of 1.

STATE OF THE ART

Under the current state of the art, skis can only be produced efficiently if a single model is consistently produced in large numbers. A change of the model is necessary, associated with high set-up times and costs, respectively. Furthermore, current methods are optimized for maximum throughput, which can be detrimental to the actual, optimal production of the skis. The present concept rearranges the levels (heat, pressure, shaping) of a ski production unit, adds new technologies, and restructures the production process. This results in a new type of manufacturing process for skis which is superior to the current state of the art in terms of set-up times, mold costs, handling and bonding of composite materials. The new process enables efficient, serial production with a batch size of 1 for the first time.

The term "ski" is used synonymously for any type of snow sliding board, for example alpine skis, touring skis, jump skis, cross-country skis, monoski, or snowboards. In the following, the term "ski" will be used throughout.

Skis are fiber composite workpieces and are made by gluing together different materials. The bonding process is usually carried out in a combined process of pressure and temperature.

The shape and function of a ski is defined by the outer contour, also called side pull, the height contour, also called height pull, the bow line, also called preload or camber line and the structure or the different materials, material thicknesses and arrangement of the different materials.

In the so-called sandwich process, the necessary components are laid on top of one another in layers and then bonded with or without temperature and with different pressures. Such a process was patented by Charles R. Hale as early as 1980 (Hale, et al., 1980). Examples of this process are available from Stockli and Atomic, among others.

In a first step, the components required for the ski are glued, usually with epoxy resin, and laid on top of one another in layers. As an alternative to gluing with liquid adhesive, pre-impregnated layers, so-called prepregs, or adhesive films can also be used. These mostly liquefy at higher temperatures and create a connection with the layers above and below.

In industrial processes, this layered structure is usually made in solid forms made of aluminum, steel or the like. In this ski shape, all components are usually placed in a lower part of the mold. After all the components have been inserted, the mold is closed with an upper mold part or a simple cover. The ski shape primarily defines the outer contour of the ski.

Fixed forms are often not used in the manufacturing sector. If there are no fixed shapes, the ski components are contoured accordingly and temporarily fixed. Usually, for example, the steel edges are fixed to a contoured surface with super glue. The layers above are then also laid on, sometimes with excess. Often the bottom component consisting of the base and steel edges is later used as a contour run-up, which is used to cut out the pressed ski. The disadvantage of this method is that there is no precise reproducibility with the quality tolerances of industrial molding processes. This manufacture structure is placed on a flat, firm base, which defines the bow line. The cover is usually made of a flat solid layer of wood, aluminum or the like. Pressure is now always applied to this unit of form or base/cover and the ski materials located in between, usually, but not necessarily, in combination with temperature. The pressure is mainly generated by a press in industrial processes. In the press process, the pressure is applied mechanically; the height depends on the material, structure, adhesive system and other parameters. Usually, it is in a range between two and twelve bar. In the manufacturing process, the pressure is occasionally generated by creating a vacuum. In the vacuum process, the assembled ski is sealed airtight with a sack or film and a vacuum is created using a vacuum pump (Marmota Magazine, 2018). The resulting pressure in this process is theoretically a maximum of one bar, in practice it is usually just below that. Another possibility is that the pressure is generated by filling hoses in a fixed frame, usually pneumatically. The height contour of the ski is created in a sandwich process by contouring the ski components. Different layer thicknesses as well as a defined layer structure determine the height contour or the height range along the longitudinal axis of the ski. In the pressing process, the most uniform possible pressure should be generated on the height contour of the ski in order to create an optimal, uniform bond despite different workpiece thicknesses.

The bow line of the ski creates the geometric shape of the contact surface. On the one hand, it can already be defined by the shape of the ski, usually in combination with a shaped substructure, and sometimes also with a superstructure. Above all in industrial processes, upper structures and substructures are used. In the manufacturing sector, the superstructure is partly dispensed with, especially when using the vacuum process.

If an industrial press is used, the upper structure and the substructure are basically permanently or at least firmly connected to the press. They represent a stamp system which distributes the pressure on the ski shape through contour and counter-contour. The aim is to precisely create the height of the ski and to distribute the temperature and pressure on the workpiece to be glued in such a way that an optimal and even bond is created.

The upper structure and the substructure are always designed for a ski model, i.e., a specific ski length and bow line. The change of a ski model is therefore always associated with a change of the upper and substructure, or with an adjustment of the same. Common methods are the use of fixed stamp systems made of solid blocks of wood or other solid and stable materials or, especially in the industrial sector, also re-adjustable stamp systems. These systems have a manual adjustability of the bow line via adjusting screws or sawtooth profiles, or an automatically regulated adjustability via CNC control elements.

If pressing is also carried out with temperature, a heating element, partially combined with a cooling element, is located on the level between the ski shape and the upper or substructure. The heating element can be designed in a wide variety of forms, with either aluminum heating plates or electric heating mats being the most common methods.

A modern ski press regulates the optimal pressing and bonding of the ski via the pressure curve, the time and the heating and cooling cycle.

A ski press thus consists of four essential components, the press, an upper and substructure, the actual ski shape and optional heating and cooling systems.

The serial ski production currently works as follows:

1. The actual ski is placed in individual parts in a mold outside of the ski press.
2. This is placed in an upper structure and substructure that is already installed in the press. If there is also a heating level and any cooling level, these are also installed in the press beforehand.
3. There the ski is pressed with pressure and increased temperature and usually also cooled down again in the mold.
4. Then the press is opened, the mold is removed and the ski is removed from the mold.
5. At the same time, a ski is already being assembled outside the press in additional, redundant mold sets and then pushed into the press. If there are no redundant mold sets, the only mold is removed from the mold, cleaned and the process begins again. In this case, the press stands still during the last-mentioned work.

The advantages of "state of the art" production are high speed and exact reproducibility and it is therefore ideally suited for large batch sizes.

However, such systems also have disadvantages. In order to change the model or length, the upper structure and substructure must be changed or adjusted, which is very complex with this system and associated with set-up times and corresponding costs. In addition, several mold sets are required for each model in order to be able to produce in series at high speed. This results in high molding costs. Especially in the case of high-temperature press processes, the components used in the ski are critically heated to their load limit. This system is widely used in industrial ski manufacturing. Usually, a processing temperature range of 90-140° Celsius is specified here. This temperature is marginally close to or above the typical Vicat Softening Temperature (VST) of some materials used for ski coverings of, for example, 128° Celsius. Typical problems such as sink marks on ski surfaces are known error patterns in industrial production. No statements can be found from the industry on this known problem.

The high-temperature curing of epoxy resins (high temperature, short curing time) results in almost 100% cross-linking and thus optimal temperature and moisture resistance, adhesive strength and chemical resistance as well as the lowest possible outgassing rates. At the same time, however, the adhesives become maximally brittle in such processes. In order to obtain the desired properties of high-temperature hardening without the disadvantages, it is advisable to slowly increase the hardening temperature, e.g. 10° C./5 min, and then slowly cool it down again. This reduces the thermal stress. However, such a process would undesirably increase the cycle time in the "state of the art" of industrial ski production.

Another disadvantage is that the materials commonly used in ski construction (steel edges, plastics, wood, aluminum, etc.) have significantly different thermal stresses. In order to avoid these disadvantages, the company Fischer Sports recently developed a method in the cross-country skiing area in which the tread is attached to the ski body afterwards and without heat and pressure (EP 2928570).

The patent specification uses the avoidance of undesirable thermal stresses as an advantage, especially with regard to the polyethylene coverings used. The company's marketing materials also describe the benefits as "unmatched wax absorption and sandability". Such a method is particularly suitable only for the production of cross-country skis, since these are subject to lower mechanical loads than alpine skis.

The cooling process essentially serves to achieve an overall fast cycle time, but it is also not to be seen as entirely positive for the hardening of the composite component. The rapid cooling causes stresses in the component or existing stresses are fixed.

Heat and pressure can only be generated while the ski shape is inserted in the press. A disadvantage resulting therefrom is that it is not possible to insert preheated components into a preheated mold. Furthermore, no tempering in the physical sense can be implemented, since when the ski shape is removed from the press, there is no possibility of controlled heating. On the other hand, if the press were to be tempered, an undesirably long cycle time would result.

SUMMARY OF THE INVENTION

The task is to avoid the disadvantages mentioned above.

A mold set according to the invention for insertion into a ski press comprises a substructure which has a base plate, a lower contour and a lower heating element; and an upper structure, which has a cover plate, an upper contour, and an upper heating element, so that a ski shape can be inserted between the substructure and the upper structure.

The superstructure preferably also has steel profiles for pressure distribution, in particular transverse steel profiles arranged in a chain-like manner.

The superstructure also preferably has an elastic compensating element.

In a further embodiment, the superstructure can be attached to the cover plate by means of tension springs.

The mold set can preferably comprise stand bars and compression springs which are arranged on the uprights and hold the molded fittings open.

A ski press according to the invention has a mold set mentioned above. In particular, the ski press includes positioning aids that are set up to fix the mold set in the ski press.

In this newly developed concept, the ski press is reduced to its function as a printing press. A set of molds, consisting of the actual ski shape and the associated upper and substructure, as well as the heating elements in between, is inserted into this "open/close" press. During production, the ski is placed in the ski mold outside of the press in a first step; In a second step, this is then inserted into the matching upper and substructure. This already contains the heating and cooling elements, i.e., certain desired heating or cooling cycles can also run outside the press (before and/or after the printing cycle). This set, consisting of 3 elements, is inserted into the press in the next step. While a set is in the press, the next model can be prepared. When the printing cycle has ended, the entire press set is pushed out of the press, and the next prepared set can be pushed in for the next print cycle immediately afterwards. The set-up time of the press is reduced to the few seconds it takes to slide the clothing out and in. The greatest advantage of the concept is that models can be changed without any set-up time. A ski from model XY with a length of 175 cm can be produced directly after model YX with a length of 151 cm. Conventional processes always require around 30 minutes of set-up time for a model or length change. The printing cycle that is necessary from a technical point of view can thus be used to the maximum. Press downtimes due to retooling processes are reduced to the minimum necessary. Another advantage is that before or after the actual pressing process, the mold set can be heated or post-tempered in a defined manner in order to achieve desired component effects or changes, and in particular to optimally compensate for thermal stresses.

DESCRIPTION OF THE PREFERRED EMBODIMENT

The concept is implemented with a system consisting of a ski press 2 which, by means of a reciprocating piston 1, moves a pressure beam 3 against a fixed beam and thus exerts pressure. Alternatively, the pressure can also be generated by other known methods, such as a pressure hose. The new system, consisting of a unit consisting of the upper and substructure, heating levels and the actual ski shape, is inserted into this press.

Figure 1:
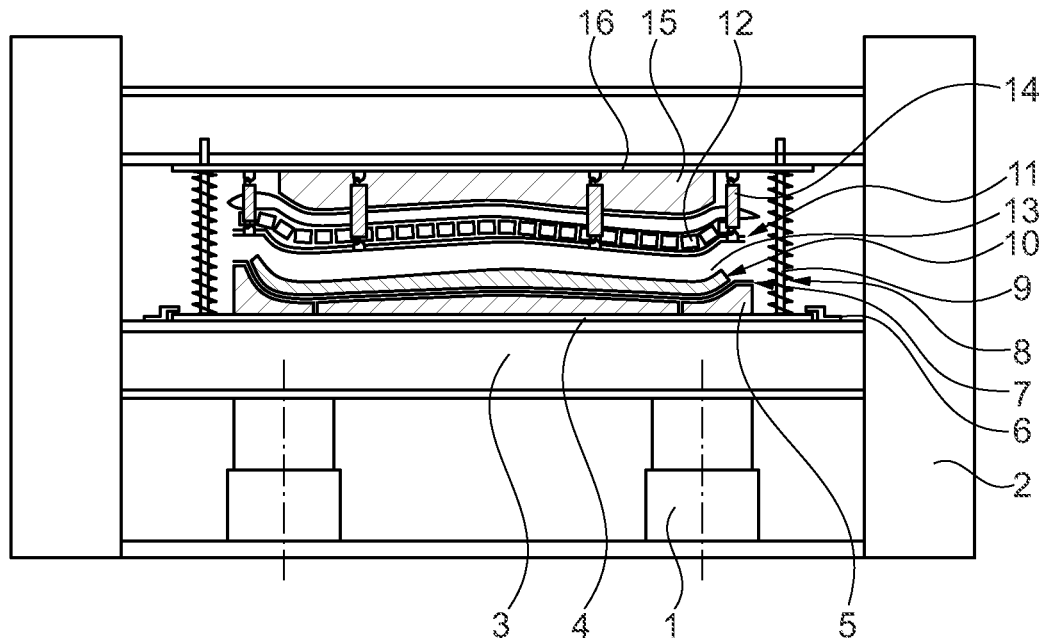
FIG. 1 shows a section through a mold set in a ski press.

In FIG. 1, the mold block is shown in a ski press 2. The individual components are the reciprocating piston of the press 1, the ski press 2, the pressure beam 3 of the press, the base plate 4 of the mold block, the lower contour 5 of the mold block, the positioning aids 6, the lower heating element 7, the compression spring 8, the stand bars 9, the Aluminum ski mold 10, the upper heating element 11, the steel profiles 12 for pressure distribution, the elastic compensating element 13, the tension spring 14 to hold the upper part of the mold block up, the upper contour 15 of the mold block and the cover plate 16 of the mold block.

The lower part of the unit forms the base plate of the mold block 4, the lower contour of the mold block 5 made of wood and the lower heating element 7. The system is kept open with compression springs 8 and stand bars 9. The ski shape itself is 10 in the middle of the unit. The upper part of the unit is composed of the upper heating element 11, the steel profiles for pressure distribution 12, as well as an elastic compensating element 13 and the upper contour of the wooden block 15. This is held on the cover plate 16 with tension springs 14. Thanks to the spring support, the upper part of the unit can be operated easily and with manual force or without additional auxiliary equipment. The ski shape 10 can then simply be filled and inserted into the system.

The shape is fixed and anchored in the system via positioning aids 6. Once the form is fixed in the system, the entire system is positively locked and inserted into the press with the aid of positioning aids 6. Due to the high weight of the mold systems, they are moved on roller systems, with robots or with the hall crane. The press is then closed, and the ski is pressed. Since the press can easily overcome the spring force of the compression springs, these do not have any negative effects on the process, or the necessary pressure compensation can simply be calculated. The entire system can then be removed, and the next mold block can be inserted. Using a turret system, different skis can be produced in batch size 1 in series.

Figure 2:
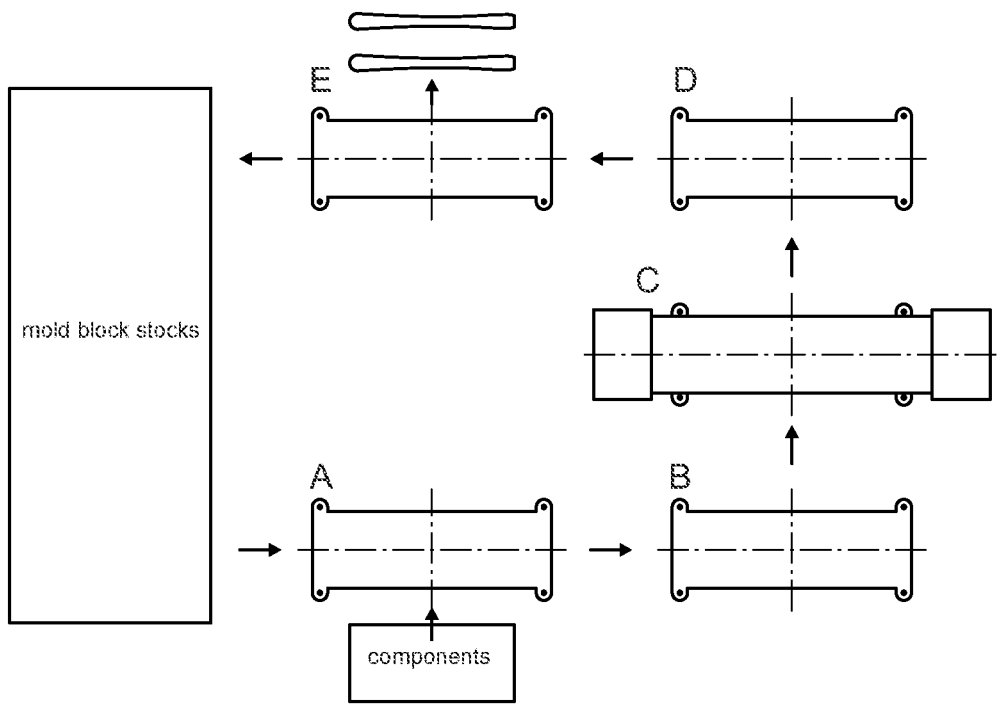
FIG. 2 shows a revolver method using the mold set from FIG. 1.

In the industry standard, ski presses are loaded or set up from one side as a standard due to the method described above. In the present case, the press is to be loaded from one side by means of a revolving system and unloaded on the other side according to the push-through principle. This turret system can be seen in FIG. 2. FIG. 2 shows in detail in step (A) the assembly of the mold block, in step (B) the preheating of the mold block, in step (C) the mold block in the press, in step (D) the post-curing of the mold block and in step (E) removing the skis from the mold. In position (A) the units are loaded outside the press, and ideally close to a component store. Here the individual ski parts are put together in the ski shape, and the ski shape is already inserted into the unit. In position (B), the entire unit can, if desired, be heated from this insertion step. The unit is pushed into the actual press in position (C) as described above. After pressing, the new type of unit can, if desired, post-heat in position (D). The ski shape is then removed in position (E) and the ski is removed from the mold.

The inventive method for producing skis relates to a rearrangement of the system components by combining the upper and substructure, heating level and ski shape into one unit with the following advantages:

a) Minimization of set-up times or relocation of set-up times from the press. The actual set-up of the press is limited to pushing the unit in and out. This is a drastic reduction in set-up times on the press and thus represents the maximum possible utilization of the press.

b) The cycle time of the press is no longer dependent on the number of existing mold sets. This results in a cost reduction, since several sets of molds no longer have to be made in order to optimally utilize the press.

The self-supporting system using stand bars and springs has the following advantages:

a) The handling of the very heavy mold superstructure and upper heating element is made easier. The high weight of these components means that they always have to be firmly connected to the press in the prior art, which makes the prior art more difficult to handle, more complicated to fix, and slower in terms of set-up times compared to the system according to the invention.

The possibility of pre- and post-tempering has the following advantages:

a) The rearrangement of the heating level in the system or the combination of the heating level with the ski shape in the unit allows the actual ski shape to be tempered independently of the time it is placed in the press or the printing cycle. Otherwise, this would only be possible with combined heating/forming tools. Such heated molds are known from other industries but are not widely used in the ski industry. The production costs of such heated molds are a multiple of the combination according to the invention of unheated ski mold with heating elements located above/below. The rearrangement of the system components is the only way in which comparatively cheap ski shapes can be tempered outside of the ski press.

b) The disadvantages of designing the heating cycle for an optimal press cycle time are eliminated, which means that the heating cycle can be designed and optimized independently and independently of the printing cycle, which has advantages in terms of compensating for structural defects, improving and eliminating undesired stresses/thermal stresses and component distortion.

c) The turret system according to the invention differs from the prior art or known systems which combine shaping, heating and cooling in one tool. Said and movable tools are expensive, highly complex and integrated metal tools. The approach presented here combines a mold level that is easier and cheaper to manufacture than heated tools with a heating level. This system has the same advantages in terms of thermal annealing as the known, more expensive and more complex systems. Compared to the well-known industrial process of ski production, however, there is the advantage that a serial individual production can be produced according to the assembly line principle. This leads to simple and efficient production logistics with comparatively low acquisition costs for the necessary tools and system components.

A molded fitting according to the invention can also have hydraulic cylinders instead of the compression springs 8 and the stand bars 9, which are correspondingly fastened to the base plate 4 and the cover plate 16 and which serve to press the base plate 4 and the cover plate 16 together. The hydraulic cylinders therefore work as pull cylinders.

The invention claimed is:

1. A mold set for insertion into a ski press (2) comprising:
   a lower structure having a base plate (4), a lower contour (5) and a lower heating element (7);
   an upper structure having a cover plate (16), an upper contour (15) and an upper heating element (11), so that a ski mold can be inserted between the lower structure and the upper structure; and
   compression springs (8) which are arranged on stand bars (9) and hold the mold set open,
   wherein the mold set is adapted for insertion into a ski press.

2. The mold set according to claim 1, wherein the upper structure further comprises steel profiles for pressure distribution (12).

3. The mold set according to claim 2, in which the upper structure further comprises an elastic compensating element (13).

4. The mold set according to claim 3, wherein the upper contour (15), elastic compensating element (13), steel profiles for pressure distribution (12), and upper heating element (11) are held on the cover plate (16) by tension springs (14).

5. The mold set according to claim 2, wherein the upper contour (15), steel profiles for pressure distribution (12), and upper heating element (11) are held on the cover plate (16) by tension springs (14).

6. The mold set according to claim 1, in which the upper structure further comprises an elastic compensating element (13).

7. The mold set according to claim 6, wherein the upper contour (15), elastic compensating element (13), and upper heating element (11) are held on the cover plate (16) by tension springs (14).

8. The mold set according to claim 1, in which the upper structure is attached to the cover plate (16) by tension springs (14).

9. A ski press apparatus, comprising a ski press, a mold set according to claim 1, and positioning aids (6) to fix the mold set in the ski press (2).

10. A revolver method for ski production using a mold set according to claim 1, comprising:
    Equipping the mold block set (A);
    Introducing the mold set into a ski press and pressing the mold set to form a ski (C); and
    removing the mold set from the ski press and demolding the ski (E),
    wherein the steps (A, C, E) are carried out simultaneously on different mold sets.

11. The method according to claim 10, in which, before the mold set is introduced into the ski press, the mold set is preheated (B).

12. The method according to claim 11, in which, before the skis are removed from the mold set, the mold set is post-tempered (D).

13. The method according to claim 10, in which, before the skis are removed from the mold set, the mold set is post-tempered (D).

14. The mold set according to claim 1, wherein the upper contour (15) and upper heating element (11) are held on the cover plate (16) by tension springs (14).

15. A mold set assembly comprising a mold set according to claim 1 and a ski mold positioned between the lower structure and the upper structure.

16. The assembly according to claim 15, wherein the ski mold is positioned between the lower heating element (7) and the upper heating element (11).

17. The mold set according to claim 1, wherein said stand bars (9) extend from said base plate (4) to said cover plate (16).

18. A method for ski production using a mold set according to claim 1, comprising:
    assembling the mold set (A) with a ski mold containing materials for manufacture of a ski to yield a mold set assembly;
    inserting the mold set assembly into a ski press and pressing the mold set assembly to form a ski (C); and
    removing the mold set assembly from the ski press and removing the ski form the ski mold (E).

* * * * *